United States Patent [19]
Schultz

[11] Patent Number: 6,058,175
[45] Date of Patent: May 2, 2000

[54] METHOD AND DEVICE FOR MANAGING SERVICES IN A TELECOMMUNICATIONS NETWORK

[75] Inventor: Roger Schultz, Karlstad, Sweden

[73] Assignee: Telefonaktiebolaget LM Ericsson, Stockholm, Sweden

[21] Appl. No.: 08/992,690

[22] Filed: Dec. 17, 1997

[30] Foreign Application Priority Data

Dec. 19, 1996 [SE] Sweden .................................. 9604696

[51] Int. Cl.⁷ ...................................................... H04M 3/42
[52] U.S. Cl. ........................... 379/201; 379/207; 370/352
[58] Field of Search .................................... 379/201, 207, 379/229, 230; 370/352

[56] References Cited

U.S. PATENT DOCUMENTS

| | | |
|---|---|---|
| 5,323,452 | 6/1994 | Dickman et al. . |
| 5,355,404 | 10/1994 | LeDuc et al. ............................. 379/201 |
| 5,422,940 | 6/1995 | Endo et al. . |
| 5,455,854 | 10/1995 | Dilts et al. . |
| 5,463,682 | 10/1995 | Fisher et al. . |
| 5,469,500 | 11/1995 | Satter et al. ............................. 379/201 |
| 5,473,680 | 12/1995 | Porter . |
| 5,517,562 | 5/1996 | McConnell ............................... 379/207 |
| 5,541,986 | 7/1996 | Hou .......................................... 379/201 |
| 5,572,581 | 11/1996 | Sattar et al. ............................. 379/201 |
| 5,644,631 | 7/1997 | Sattar et al. ............................. 379/201 |
| 5,703,940 | 12/1997 | Sattar et al. ............................. 379/201 |
| 5,802,159 | 9/1998 | Smolentzov et al. .................... 379/201 |
| 5,915,008 | 6/1999 | Dulman .................................... 379/201 |

FOREIGN PATENT DOCUMENTS

| | | |
|---|---|---|
| 602 295 | 6/1994 | European Pat. Off. . |
| 696 146 | 2/1996 | European Pat. Off. . |
| 07334445 | 12/1995 | Japan . |
| 2 273 418 | 6/1994 | United Kingdom . |
| WO94/23523 | 10/1994 | WIPO . |
| WO95/23483 | 8/1995 | WIPO . |
| WO95/34175 | 12/1995 | WIPO . |
| WO95/34980 | 12/1995 | WIPO . |

OTHER PUBLICATIONS

E. Cambré, "Intelligent Networks: the key to new services," Alcatel Telecommunications Review, pp. 14–21 (1996).

*Primary Examiner*—Scott Wolinsky
*Attorney, Agent, or Firm*—Burns, Doane, Swecker & Mathis, L.L.P.

[57] ABSTRACT

Apparatus and methods for designing; providing and managing customer services in a telecommunications network are disclosed. The services are handled in a separate service network, connected to the telecommunications network in a logical service, for example an SCP in an intelligent network. The service network is based on existing and commonly available network resources, for example, the Internet. Also, existing and commonly available terminals, such as personal computers are used for handling the services.

8 Claims, 3 Drawing Sheets

METHOD AND DEVICE FOR MANAGING SERVICES IN A TELECOMMUNICATIONS NETWORK

TECHNICAL FIELD

The present invention relates to telecommunications networks, and more specifically to the design, deployment, management and execution of services in such networks.

BACKGROUND

Today, a subscriber can manage such services in two ways: by calling an operator and asking for the service to be activated or deactivated or by pressing a combination of keys on the telephone. Both these ways are perceived as cumbersome by many subscribers. The key combinations are often long and hard to remember, and the lack of guidance to the subscriber causes mistakes or scares the subscriber from even trying. The complexity of the user interface also limits the number and flexibility of the services that can effectively be used.

Universal Personal Telecommunication (UPT) is a concept for assigning a personal telephone number to each individual through which a person can always be reached regardless of his or her location. Logic functions in the network direct any incoming call to a telephone where the subscriber is currently found. The service works between different types of network, such as the Public Services Telephone Network (PSTN) and mobile networks. UPT is normally implemented in an intelligent network, but may be implemented in any kind of telecommunications network.

Other examples of services preferably implemented in an Intelligent Network (IN) are call forwarding, call waiting and screening of calls.

There is no standard for the design, management and execution of services in intelligent networks or other telecommunications networks today. Therefore, such services are based on proprietary solutions or on programming languages that have to be compiled directly for one host computer. Therefore they cannot be moved between different kinds of equipment. There is no standard programming language, no standard format for transferring service logic to the SCPs and no standard interface for managing services. All these factors for design, deployment and management of services in an intelligent network also depend on the service vendor.

This creates a number of problems for the telecommunications operators and for the subscribers:

Because many solutions are proprietary, the codes for activating or changing services may vary between different vendors' equipment. Also, it is difficult for the telecommunications operator to combine equipment from different vendors.

As the environments are so specialized, it is difficult to modify services. With the priorly known solutions, it is impossible for a subscriber to design or modify his/her own services.

The service mobility is poor. Automatic activation of services must generally be done from the subscriber's own phone.

The service profile of a particular subscriber cannot be moved to another operator if the subscriber wants to change.

WO 95/34980 describes a customized telecommunications service where a service provider or a system vendor can provide and modify services tailored according to the customers' needs and wishes. The network comprises a number of service shells, each relating to a particular service. A service shell contains basic logic for the shell and customization points in which services may be added by a system vendor or modified by a service provider. The subscriber is able to fine-tune the service for his or her own purposes. ISDN is suggested as a network for the input of user data. U.S. Pat. No. 5,323,452 discloses a system and method for creating and modifying intelligent network call processing in a visual environment. No network solution is suggested.

Thus, there is a need for a network solution for the design, deployment, management and execution of services. To be useful to as many people as possible the network and the cost for connecting must be kept as low as possible. One way of achieving this is to use existing network resources and terminals where possible.

It is therefore an object of the invention to provide a method for service management in a telecommunications network which to as great an extent as possible uses existing network resources and terminals.

It is also an object of the invention to provide a method and a network in which it is easy to design, deploy, manage and execute services for subscribers in a telecommunications network.

It is another object of the invention to create a service network which is flexible, yet easy to manage for a subscriber.

It is another object of the invention to obtain a standard for creating service programs which can be executed on different types of equipment.

It is still another object of the invention enable management of services independently of the subscriber's physical location;

It is yet another object of the invention to achieve service portability, including enabling a customer to move his or her services to another operator.

SUMMARY

Some of these objects are achieved in a telecommunications network designed as disclosed in the independent claims. The remaining objects are achieved in certain embodiments of the invention as disclosed in the dependent claims.

The invention offers the following advantages:

All services can be handled in the same way via the same interface.

Service provisioning and service management can be performed using the same terminals and the same network.

The risk of errors when modifying services is reduced as the customer can see the results of the changes while they are being made.

The customers can use existing equipment for communicating with the network.

Existing network resources can be used for the service network.

A preferred embodiment of the invention offers the following additional advantages:

State of the art development environments can be used for creation of services.

The downloading of services is made more efficient.

Services can be managed by the subscriber independently of his or her location.

A subscriber's service profile and services can be moved between operators.

BRIEF DESCRIPTION OF THE DRAWINGS

The invention will be further discussed below with particular reference to the enclosed drawings, in which.

DETAILED DESCRIPTION

Figure 1:
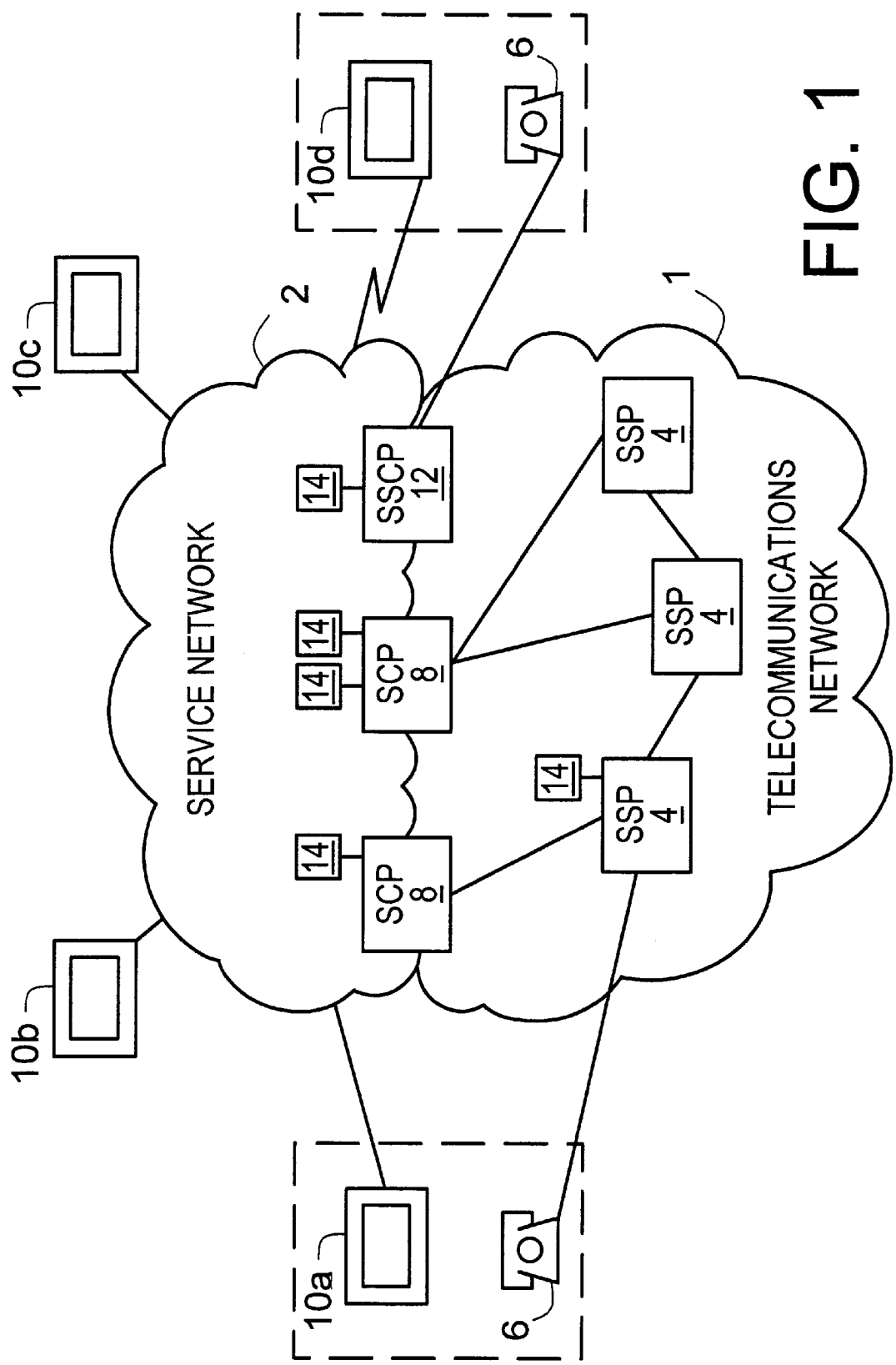
FIG. 1 shows schematically a general concept for intelligent telecommunications networks (IN) according to the invention.

An intelligent network according to the invention is shown ain FIG. 1. The network is divided into two main parts. The actual calls are made, and the services are used, in the telecommunications network 1. The service network 2 is used for creating, downloading and managing the services offered by the IN. The telecommunications network 1 is made up of a numb er of SSPs (Service Switching Points) 4 to which telephones 6 and other telecommunications equipment such as telefaxes may be connected. The SSPs are connected to one or more SCPs (Service Control Points) 8 which contain the control logic and service software of the network. One or more intelligent peripheries may be connected to the SSPs and the SCPs for providing databases, reference information etc.

The service network consists of a number of terminals 10a, 10b, 10c, 10d which are connected to the SCPs, either via a wire or cable link as illustrated for 10b or via a radio link as illustrated for 10d. Each subscriber may have a terminal 10a, 10d, and service providers and operators may have terminals 10b, 10c. The subscribers' terminals 10a, 10d are used by the subscribers to modify, activate or deactivate services in the telecommunications network 1.

Terminals 10a, 10b, 10c and 10d may each contain a graphical user interface, as commonly known in the art.

To get access to the service management interfaces, user identification is required. A user profile may be defined for each user, to give the user access to the functions he or she should be allowed to perform. For example, service vendors 10b and operators 10c may be allowed to download programs to the network 2. Some subscribers 10a, 10d may be allowed to manage all kinds of services and others may have access only to certain services. Some subscribers may be allowed to modify services.

In a preferred embodiment of the invention, described below, all terminals 10a, 10b, 10c, 10d could be any type of standard computers, such as PC or workstation, so that the same terminals can be used for designing and providing services as well as for managing services.

As shown in FIG. 1, the switching and logic functions performed by the SSPs and SCPs in the network may be combined in one unit called a Service Switching and Control Point, SSCP 12. One or more SSCPs could be provided together with one or more combinations of SSPs and SCPs in the network.

If voice prompting of subscriber actions is to be used, at least one Intelligent Periphery (IP) 14 containing the voice message must be used in connection with an SSP, an SCP or an SSCP.

Figure 2:
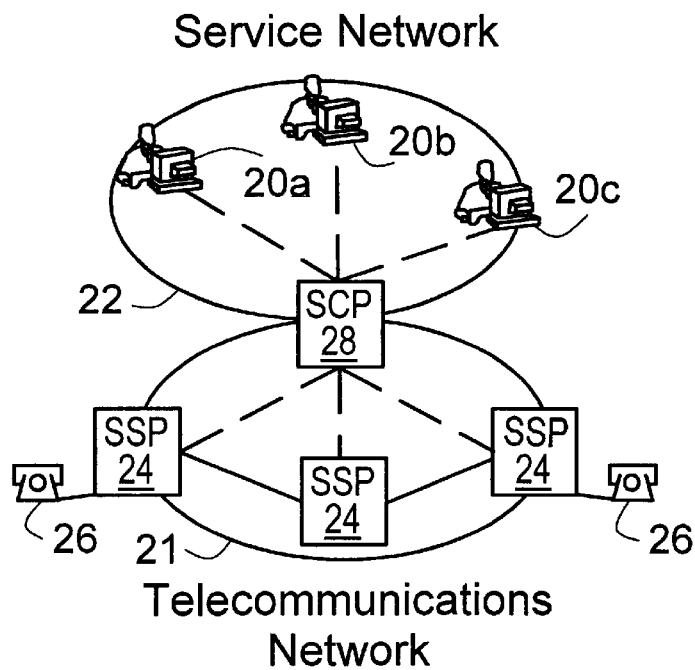
FIG. 2 shows an intelligent telecommunications network according to a first embodiment of the invention.

In FIG. 2, which shows the network according to a first embodiment of the invention, the telecommunications network 21 comprises SSPs 24 to which the subscribers' telephones 26 are connected. The SSPs 24 are also connected an SCP 28. More than one SCP 28 may be present in the network as shown in FIG. 1. A number of terminals 20a, 20b, 20c are connected to the service network 22. These terminals are ordinary computers such as PCs or workstations, physically connected to the SCP 28 via a computer network. Of course the SSPs 24 and SCP 28 could be replaced by one or more SSCPs 12 as shown in FIG. 1.

Three terminals 20a, 20b and 20c are shown to illustrate the three main uses of the terminals: a) design of services, b) provisioning of services and c) service management. Service providers and service vendors will use the terminals 20b, 20c for designing services and downloading them to the SCP 28, and subscribers will use the terminals 20a to activate, deactivate or change services. It will also be possible for subscribers to design their own services or to modify existing services. All terminals have interpreters for the programming language used for the service programs.

The three terminals 20a, 20b and 20c may each contain a graphical user interface for displaying subscriber service data, as commonly known in the art.

Figure 3:
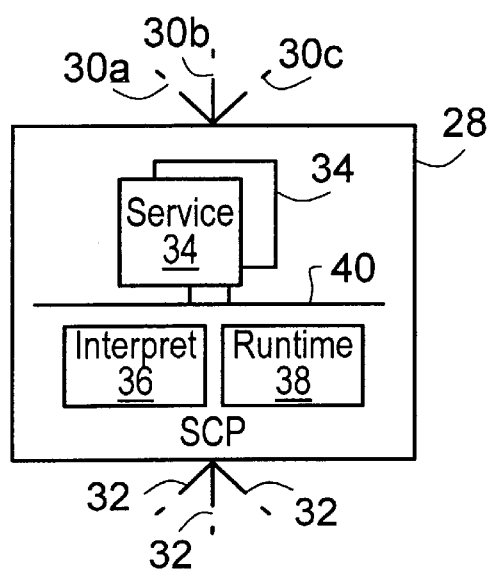
FIG. 3 shows a Service Control Point (SCP) in an IN according to the first embodiment of the invention.

FIG. 3 shows an SCP 28 configured according to the first embodiment of the invention. The SCP 28 has service network connections 30a, 30b, 30c to the terminals 20a, 20b, 20c in the service network 22 and INAP connections 32 to the SSPs. The SCP 28 comprises one or more service programs 34 written in the programming language mentioned above, an interpreter 36 for the programming language and a runtime environment 38. A standardized Application Programming Interface (API) 40 is used, which is a prerequisite for service portability.

Each service program 34 comprises two parts: The first part is the service execution program, which actually executes the service as shown in the flowchart in FIG. 6, which will be described further below. The other part is the service management part. One portion of the services management part 34 is downloaded to the subscriber's terminal 10a when a service is to be managed as shown in the flowchart in FIG. 5, also described further below; the other portion is run in the SCP 28. The service management part and the service execution part cooperate by sharing data through the API 40. The service management part sets the data which is used by the service execution part. To achieve true service mobility, the API 40 must be standardized for all SCPs.

To achieve true mobility of services, both the service management part and the service execution part must be implemented in the same programming language, for which interpreters must be available in all terminals. However, it is possible to implement only the service management part in this programming language and the service execution part in another programming language. In this case, the service designer must have access to both programming languages.

The runtime environment 38 is used when a service is executed during a call. The service uses the API 40 which uses the runtime environment to execute orders toward the SSP. The runtime environment 38 also provides the possibility to store service data, for example in a database.

As a service network, it is feasible to use an existing network to which anybody can connect, and to which a number of people are already connected. Such a network today is the World Wide Web.

An interpreted programming language, and preferably one for which interpreters are available on all standard computers, is used for the service programs 34. In this way, each node may be any kind of standard computer, such as workstation or PC. An example of such a programming language is Java, which, among other things, makes it possible to program interactive pages on the Internet. Another feasible program ng language available today is ActiveX from Microsoft.

Any static HTML web page can be designed to allow the user to send data to the network. In most cases, all input checks must be carried out in the receiving computer, in this case the SCP 28, which makes the procedure more cumbersome for the user. The use of a downloaded program that makes it possible to have an interactive page makes the management of services faster and more user friendly, as the user's own computer can check that the input is correct.

Figure 4:
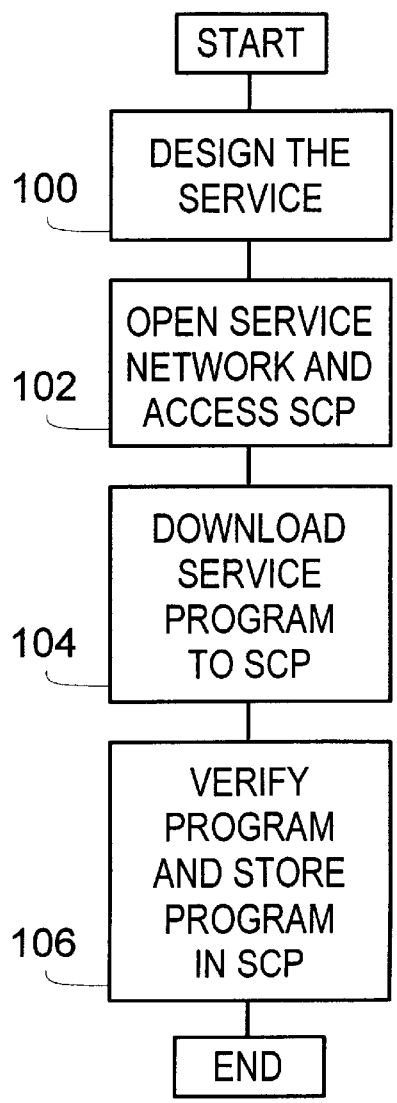
FIG. 4 shows the steps taken to make a service available in the network according to the first embodiment of the invention.

FIG. 4 shows the steps taken when a service is to be made available in the service network:

Step 100: The service provider designs a service program. The service program is developed in an interpreted programming language for which interpreters are available on all computers.

Step 102: The service provider opens the service network and accesses the SCP 28.

Step 104: The service provider downloads the service program to the appropriate SCP 28.

Step 106; The program is verified and stored in the SCP 28.

Of course, these steps can be performed by anyone. The flexibility of this will make it possible to let subscribers design or modify services in the network.

Figures 5, 6:
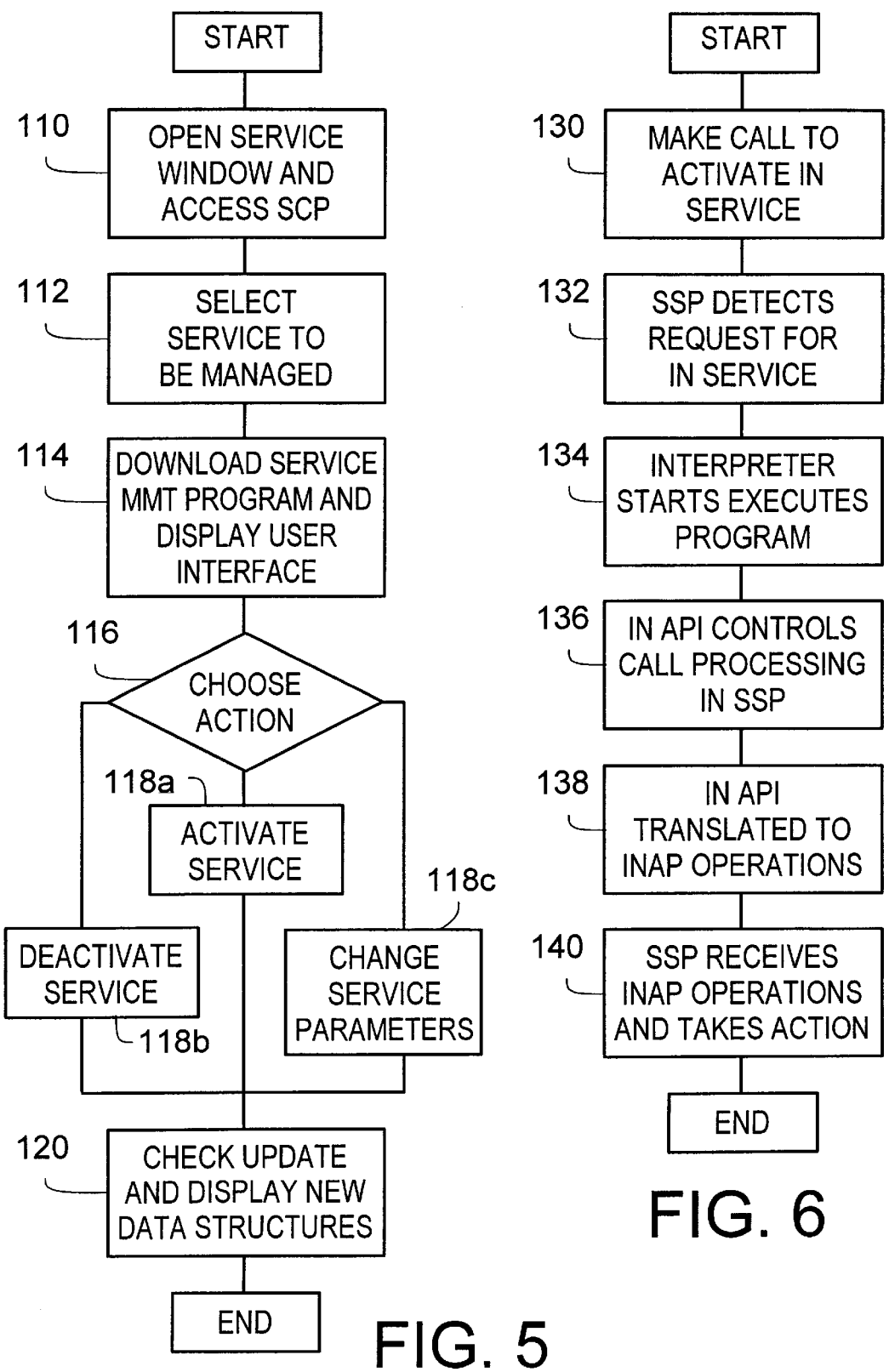
FIG. 5 shows the steps taken to activate, deactivate or change a service for a particular subscriber according to the first embodiment of the invention.
FIG. 6 shows the steps taken when a service is executed (used) according to the first embodiment of the invention.

FIG. 5 shows the steps taken by a subscriber to activate, deactivate or change a service.

Step 110: The subscriber opens the service window and accesses the site (for example a page in the World Wide Web) in the SCP, from which services can be managed.

Step 112: The subscriber chooses the service that should be managed.

Step 114: The appropriate service management program is downloaded from the SCP 28. A service management page is displayed on the subscriber's computer.

Step 116: The subscriber chooses what to do to the service and continues with step 118*a*, 118*b* or 118*c*.

Step 118*a*: The subscriber chooses to activate the service.

Step 118*b*: The subscriber chooses to deactivate the service.

Step 128*c*: The subscriber chooses to change service parameters.

Step 120: The management pro gram checks that the new data is consistent. The service parameters for the customer are updated in the SCP 28 and the change is confirmed to the subscriber.

FIG. 6 shows the steps taken when a service is to be executed.

Step 130: A subscriber makes a call.

Step 132: The SSP 24 identifies a request for an IN service concerning the call and initiates the execution of the service execution program 34 in the SCP 28.

Step 134: The SCP 28 starts the program interpreter 36 and executes the program 34.

Step 136: The service program 34 instructs the IN runtime system 38 through the IN API 40 to control the call processing.

Step 138: The IN API method calls are translated to INAP operations.

Step 140: The SSP 24 receives operations over the INAP connections 32 so that the selected service is performed for the call.

Although in most of the description above, terminology relating to intelligent networks is used, it will be understood that the logical function of the components in the network (e.g. SSP, SCP, SMS) could be implemented in other components in any telecommunications network.

What is claimed is:

1. A method of handling subscriber services in an intelligent network, where services are stored in connection to at least one logical service means connected to a service network, the method comprising the steps of:

connecting the service network to a telecommunications network via the at least one logical service means;

connecting a subscriber terminal having a graphical user interface to the service network;

managing services at the logical service means through the graphical user interface; and downloading at least part of a service program to the subscriber terminal, wherein the service program is implemented in three parts comprising:

a service execution part, a first portion of a service management part to be run in the logical service means, and a second portion of the service management part to be downloaded to the subscriber terminal for service management.

2. The method of claim 1, wherein the telecommunications network is an intelligent network, and the logical service means are Service Control Points (SCP) or Service Switching and Control Points (SSCP).

3. The method of claim 1, further comprising the step of connecting a service provider and/or services vendor terminal to the same service network as the subscriber terminal.

4. The method of claim 1, further comprising the step of using Internet as the service network.

5. An intelligent network in which subscriber services can be handled, comprising:

a telecommunications network in which calls are made and the services are used;

a service network comprising an existing and commonly available network;

at least one logical service means connecting the service network to the telecommunications network; and a subscriber terminal having a graphical user interface for displaying the subscriber services, connected either to the telecommunications network or to the service network, for managing the subscriber services, wherein at least part of a service program is downloaded to the subscriber terminal for displaying and editing, wherein the service program is implemented in three parts comprising:

a service execution part;

a first portion of a service management part to be run in the logical service means; and a second portion of the service management part to be downloaded to the subscriber terminal.

6. The intelligent network of claim 5, further comprising Service and Control Switching Points (SSCP) and/or Service Switching Points (SSP), and wherein the logical service means are Service Control Points (SCP) or SSCPs.

7. The intelligent network of claim 5, wherein service providers' and/or service vendors' terminals are connected to the same network as the subscriber terminal.

8. The intelligent network of claim 5, wherein the Internet is used to connect the subscribers to the logical service means in the service network.

* * * * *